(12) United States Patent
Wu (10) Patent No.: US 10,788,674 B2
(45) Date of Patent: Sep. 29, 2020

(54) WAVEGUIDE ASSEMBLY INTEGRATED WITH SENSING FUNCTIONS AND INTELLIGENT DISPLAY WEARABLE DEVICE

(71) Applicant: BOE Technology Group Co., Ltd., Beijing (CN)

(72) Inventor: Naifu Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 138 days.

(21) Appl. No.: 16/211,607

(22) Filed: Dec. 6, 2018

(65) Prior Publication Data
US 2019/0204602 A1 Jul. 4, 2019

(30) Foreign Application Priority Data
Jan. 2, 2018 (CN) .......................... 2018 1 0002773

(51) Int. Cl.
*G02B 27/14* (2006.01)
*G02B 27/01* (2006.01)
(Continued)

(52) U.S. Cl.
CPC ......... *G02B 27/0172* (2013.01); *G02B 6/005* (2013.01); *G02B 6/0055* (2013.01);
(Continued)

(58) Field of Classification Search
CPC .. G02B 27/0172; G02B 6/005; G02B 6/0055; G02B 5/208; G02B 2027/0123;
(Continued)

(56) References Cited

U.S. PATENT DOCUMENTS

2014/0078591 A1* 3/2014 Mukawa ................... G02B 5/18
359/630
2017/0202722 A1 7/2017 Lei et al.

FOREIGN PATENT DOCUMENTS

CN 2532498 Y 1/2003
CN 201740950 U 2/2011
(Continued)

OTHER PUBLICATIONS

Chinese First Office Action, including Search Report, with English translation, for Chinese Patent Application No. 201810002773.1, dated Jul. 1, 2019, 15 pages.

*Primary Examiner* — William Choi
(74) *Attorney, Agent, or Firm* — Westman, Champlin & Koehler, P.A.

(57) ABSTRACT

A waveguide assembly integrated with sensing functions and an intelligent display wearable device are provided. The waveguide assembly includes: an exit pupil expansion waveguide structure and a plurality of reflective sheets. The reflective sheets are arranged at intervals in the exit pupil expansion waveguide structure and arranged obliquely with respect to a light-exiting surface of the exit pupil expansion waveguide structure. A first reflective film and a second reflective film are respectively arranged on two sides of each of the reflective sheets. The second reflective film is an infrared reflective film or an ultraviolet reflective film, and arranged on a side of the reflective sheet away from the light-exiting surface of the exit pupil expansion waveguide structure. The first reflective film is arranged on a side of the reflective sheet close to the light-exiting surface of the exit pupil expansion waveguide structure.

20 Claims, 3 Drawing Sheets

(51) Int. Cl.
*F21V 8/00* (2006.01)
*G02B 5/20* (2006.01)

(52) U.S. Cl.
CPC ...... *G02B 5/208* (2013.01); *G02B 2027/0123* (2013.01); *G02B 2027/0125* (2013.01); *G02B 2027/0138* (2013.01); *G02B 2027/0178* (2013.01)

(58) Field of Classification Search
CPC .... G02B 2027/0125; G02B 2027/0138; G02B 2027/0178
USPC .................................. 359/630, 633; 345/7–9
See application file for complete search history.

(56) References Cited

FOREIGN PATENT DOCUMENTS

| | | |
|---|---|---|
| CN | 203303236 U | 11/2013 |
| CN | 204883092 U | 12/2015 |
| CN | 205121062 U | 3/2016 |
| CN | 105487232 A | 4/2016 |
| CN | 106597672 A | 4/2017 |
| CN | 106932904 A | 7/2017 |
| CN | 107390380 A | 11/2017 |

\* cited by examiner

WAVEGUIDE ASSEMBLY INTEGRATED WITH SENSING FUNCTIONS AND INTELLIGENT DISPLAY WEARABLE DEVICE

CROSS-REFERENCE TO RELATED APPLICATION

This application claims a priority to Chinese Patent Application No. 201810002773.1 filed on Jan. 2, 2018, the present disclosure of which is incorporated in its entirety by reference herein.

TECHNICAL FIELD

The present disclosure relates to the field of display, in particular to a waveguide assembly integrated with sensing functions and an intelligent display wearable device.

BACKGROUND

Augmented Reality (AR) technology is a new technology that seamlessly integrates real world information with virtual world information. Entity information (such as visual information, sound, taste and touch) that is difficult to be experienced in certain time and space of the real world is simulated and superimposed through a computer and other science and technology, the virtual information is applied into the real world and sensed by human senses, so as to superimpose the real-world environment and virtual objects onto the same scenario or space in a real time manner, and achieve a sensory experience beyond reality. With such technology, not only the real world information is displayed, but also the virtual information is displayed simultaneously, the two kinds of information are complemented and superimposed with each other. In the visual augmented reality, a user may combine the real world with computer graphics using a helmet display, and has an interactive experience with a strong science and technology sense. In addition, with the appearance of AR glasses, the augmented reality technology has not been limited to pure visual superposition, but has been developed towards a direction of multi-functions and diversification, which puts higher demands on the functionality of AR glasses.

A waveguide structure for an intelligent display wearable device and the intelligent display wearable device in the related art are yet in need of improvement.

SUMMARY

In a first aspect, a waveguide assembly integrated with sensing functions is provided according to the present disclosure, which includes:
an exit pupil expansion waveguide structure; and
a plurality of reflective sheets, where the plurality of reflective sheets is arranged at intervals in the exit pupil expansion waveguide structure and arranged obliquely with respect to a light-exiting surface of the exit pupil expansion waveguide structure,
where a first reflective film and a second reflective film are respectively arranged on two sides of each of the plurality of reflective sheets, the second reflective film is an infrared reflective film or an ultraviolet reflective film and arranged on a side of the reflective sheets away from the light-exiting surface of the exit pupil expansion waveguide structure, and the first reflective film is arranged on a side of the reflective sheets close to the light-exiting surface of the exit pupil expansion waveguide structure.

In some optional embodiments, each of the first reflective films of the plurality of reflective sheets is a visible light reflective film.

In some optional embodiments, the plurality of reflective sheets is arranged in parallel at equal intervals along a light propagation direction of coupled incident light propagating in the waveguide structure.

In some optional embodiments, the waveguide assembly further includes: a light source and a sensor, where in a case that the second reflective film is an infrared reflective film, the light source is an infrared light source, and the sensor is an infrared sensor; and in a case that the second reflective film is an ultraviolet reflective film, the light source is an ultraviolet light source, and the sensor is an ultraviolet sensor.

In some optional embodiments, the waveguide assembly further includes: a low-pass dichroic film configured to transmit visible light and reflect infrared or ultraviolet light. The light-exiting surface of the exit pupil expansion waveguide structure is a first surface, a surface opposite to the light-exiting surface of the exit pupil expansion waveguide structure is a second surface, and the low-pass dichroic film is arranged below the first surface of the exit pupil expansion waveguide structure. The light source is arranged above the second surface of the exit pupil expansion waveguide structure, and is configured to emit the infrared or ultraviolet light to the second reflective film and the low-pass dichroic film. The sensor is configured to receive outgoing light that is emitted by the light source, and then reflected repeatedly by the second reflective film or the low-pass dichroic film.

In some optional embodiments, transmittance of the low-pass dichroic film for light with wavelengths in a range from 400 nm to 760 nm is greater than 80%, and a reflective index of the low-pass dichroic film for light with wavelengths in a range from 800 nm to 1300 nm is greater than 85%.

In some optional embodiments, a total reflective material is coated on a side of the first surface of the exit pupil expansion waveguide structure close to the reflective sheets, and is coated on a side of the second surface of the exit pupil expansion waveguide structure close to the reflective sheets.

In some optional embodiments, reflective indexes of the first reflective films of the plurality of reflective sheets are set to be larger sequentially along the light propagation direction of the coupled incident light propagating in the waveguide structure.

In some optional embodiments, reflective indexes of the second reflective films of the plurality of reflective sheets are set to be larger sequentially along a light propagation direction of coupled incident light propagating in the waveguide structure.

In some optional embodiments, the number of the plurality of reflective sheets is 5, and the reflective indexes of the first reflective films of the plurality of reflective sheets are 12.88%, 13.6%, 15.8%, 18.8%, and 23.1% sequentially along the light propagation direction of the coupled incident light propagating in the waveguide structure, the first reflective film with the reflective index of 23.1% is closest to the light-exiting side of the exit pupil expansion waveguide structure, and the first reflective film is set to have transmittance of 0 and absorptance of 76.9%.

In some optional embodiments, the number of the plurality of reflective sheets is 5, and reflective indexes of the first reflective films of the plurality of reflective sheets are"

23.1%, 18.8%, 15.8%, 13.6%, and 12.88% sequentially along the light propagation direction of the coupled incident.

In a second aspect, an intelligent display wearable device is provided according to the present disclosure, which includes: a pair of lenses, and each of the lenses including the above-described waveguide assembly integrated with sensing functions.

In some optional embodiments, the intelligent display wearable device includes a helmet or glasses having two lenses.

In some optional embodiments, the sensor is arranged between two lenses.

In some optional embodiments, the intelligent display wearable device further includes:
- a first coupling input component configured to couple visible light into the first reflective films of the waveguide assembly; and
- two second coupling input components configured to couple infrared or ultraviolet light into the second reflective films of the waveguide assembly,
- where each of the second coupling input components is arranged on a side of the respective lens away from the sensor.

BRIEF DESCRIPTION OF THE DRAWINGS

In order to explain the technical solutions in embodiments of the present disclosure or the related art more clearly, accompanying drawings used in the description of the embodiments or the related art are briefly illustrated hereinafter. Apparently, the accompanying drawings described hereinafter are only some embodiments of the present disclosure, and those skilled in the art can further obtain other drawings according to the drawings without creative work.

DETAILED DESCRIPTION

Hereinafter, embodiments of the present disclosure are described in detail, examples in the embodiments are shown in the accompanying drawings, and same or similar reference numerals refer to same or similar elements or elements having same or similar functions. The embodiments described with reference to the drawings are exemplary, merely used for explaining the present disclosure, but should not be construed as limiting the present disclosure.

Figure 1:
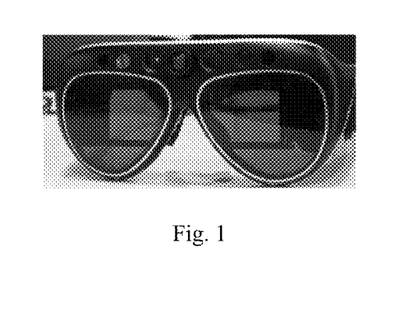
FIG. 1 shows a schematic structural diagram of AR glasses in the related art.

The multi-functional intelligent display wearable device (for example, AR glasses) in the related art has a problem of complicated structure, mainly because a plurality of functional elements are usually simply superposed in the intelligent display wearable device in the related art. Taking AR glasses as an example, the AR glasses include a waveguide structure, which can realize the augmented reality. In order to integrate the AR glasses with other sensing functions, a sensing device and a detecting device are usually additionally added to the outside or the upper portion of the glasses, and the detecting device may include a camera, which causes the AR glasses integrated with sensing functions to have a complicated structure and occupy a large amount of space. With the development of the augmented reality technology, the intelligent display wearable device is required to have several functions, and the intelligent display wearable device with the multi-functional superposition requires to increase the functional elements such as sensors. However, too many elements may occupy a large amount of space in the glasses on one hand, affecting the appearance; on the other hand, the weight of the entire glasses may be increased, causing discomfort for the wearer, as shown in FIG. 1. The intelligent display wearable device in the related art is in need of improvement. The present disclosure is intended to alleviate or solve the above-mentioned problems at least to some extent.

Figure 2:
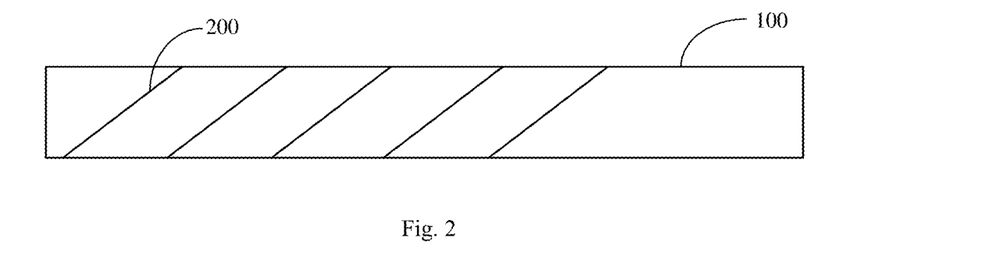
FIG. 2 shows a schematic structural diagram of a waveguide assembly integrated with sensing functions according to at least one embodiment of the present disclosure.

In a first aspect, a waveguide assembly integrated with sensing functions is provided according to at least one embodiment of the present disclosure, referring to FIG. 2. The waveguide assembly includes: an exit pupil expansion waveguide structure 100; and a plurality of reflective sheets 200. The plurality of reflective sheets 200 is arranged at intervals in the exit pupil expansion waveguide structure 100 and arranged obliquely with respect to a light-exiting surface of the exit pupil expansion waveguide structure 100.

A first reflective film and a second reflective film are respectively arranged on two sides of each of the reflective sheets 200, the second reflective film is an infrared reflective film or an ultraviolet reflective film and arranged on a side of the reflective sheet 200 away from the light-exiting surface of the exit pupil expansion waveguide structure 100.

Figure 3:
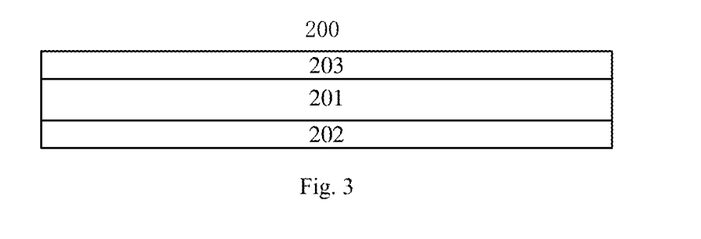
FIG. 3 shows a schematic structural diagram of a reflective sheet of a waveguide assembly according to at least one embodiment of the present disclosure.

In some optional embodiments, as shown in FIG. 3, the reflective sheet 200 includes a substrate 201, a first reflective film 202 and a second reflective film 203. Optionally, the first reflective film 202 may be a visible light reflective film, and arranged on a side of the reflective sheet 200 close to the light-exiting surface of the exit pupil expansion waveguide structure 100. It can be understood that the light-exiting surface of the exit pupil expansion waveguide structure 100 is close to human eyes.

Optionally, the plurality of reflective sheets 200 may be arranged in parallel at equal intervals or at variable intervals, which may be designed by those skilled in the art according to actual needs, and is not limited herein. The number of the reflective sheets 200 is not limited in the embodiments of the present disclosure, which may be designed by those skilled in the art according to actual needs.

For ease of understanding, the operating principle of the waveguide assembly according to the embodiments of the present invention is first briefly described below.

In order to integrate the AR glasses in the related art with the sensing function, the sensing device and the detecting device are additionally added to the outside or the upper portion of the glasses, and the detecting device may include a camera. As shown in FIG. 1, the AR glasses have a thick and heavy frame above the lenses, and the cameras and other several round functional elements arranged on the frame. Those elements may occupy a large amount of space in the glasses on one hand, affecting the appearance; on the other hand, the weight of the entire glasses may be increased, causing discomfort for the wearer.

According to an embodiment of the present disclosure, the waveguide assembly integrated with sensing functions includes a plurality of reflective sheets, and the reflective films are arranged on both sides of each of the reflective sheets. The reflective film arranged on the side of the reflective sheet 200 away from the light-exiting surface of the exit pupil expansion waveguide structure 100 is an infrared or ultraviolet reflective film. In this case, an infrared detecting or ultraviolet sensing function may be integrated while the exit pupil is expanded. Since the infrared or ultraviolet reflective film for the sensing function and the reflective film for expanding the exit pupil are respectively integrated on both sides of the reflective sheet, no additional reflective sheet is needed, decreasing the components and reducing the weight of the waveguide assembly. Therefore, multi-functional integration is achieved while the lightness and thinness of the waveguide assembly is ensured.

In addition, an optical product including the above waveguide assembly may have a larger angle as the geometric optical waveguide expands an entrance pupil for the infrared or ultraviolet light, and may collect infrared or ultraviolet signals in a wider light-incident surface, i.e., a wider entrance pupil region, as compared with infrared or ultraviolet sensing camera lens in the related art. Although the infrared or ultraviolet stray light exists, the presence of the infrared stray light has no effect on the viewing experience of the optical product, since the infrared or ultraviolet signals are invisible for the human eyes.

Figure 4:
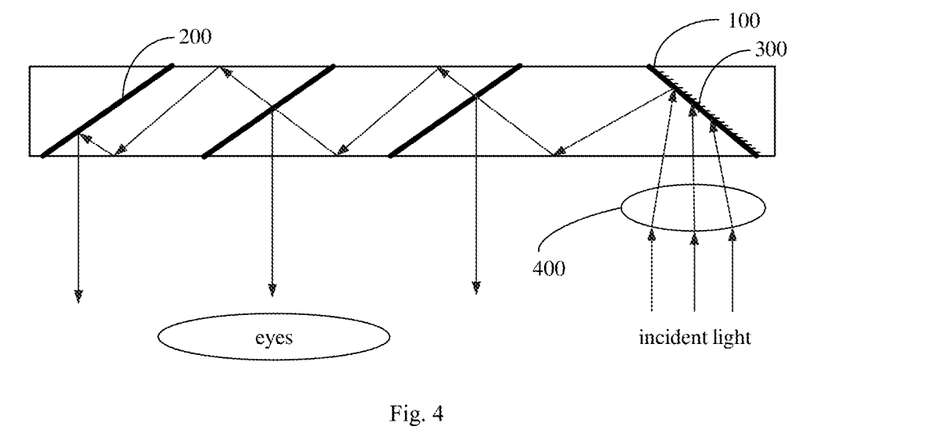
FIG. 4 shows a schematic diagram of optical paths of a waveguide assembly for exit pupil expansion according to at least one embodiment of the present disclosure.

In some optional embodiments, as shown in FIG. 4, the waveguide assembly further includes a first coupling input component 400 and a total reflective sheet 300, and the upper and lower inner surfaces of the waveguide assembly are coated with a reflective material for achieving total reflection. The first coupling input component 400 can be an eyepiece for transmitting incident light to the total reflective sheet 300. The light reflected by the total reflective sheet 300 is continuously totally reflected on the upper and lower inner surfaces of the waveguide assembly, and the vertical expanding waveguide is realized. After the light is reflected by the plurality of reflective sheets 200 multiple times, the waveguide is expanded in the horizontal direction, that is, the horizontal expanding waveguide is realized, and finally the light exits from the lower surface, i.e., the light-exiting surface, of the waveguide assembly into the human eyes. As can be seen from FIG. 4, after the narrow incident light enters the waveguide assembly, the width of the emergent light is enlarged, and the image can be obtained when the user's eye falls within the wider exit pupil area.

Figure 5:
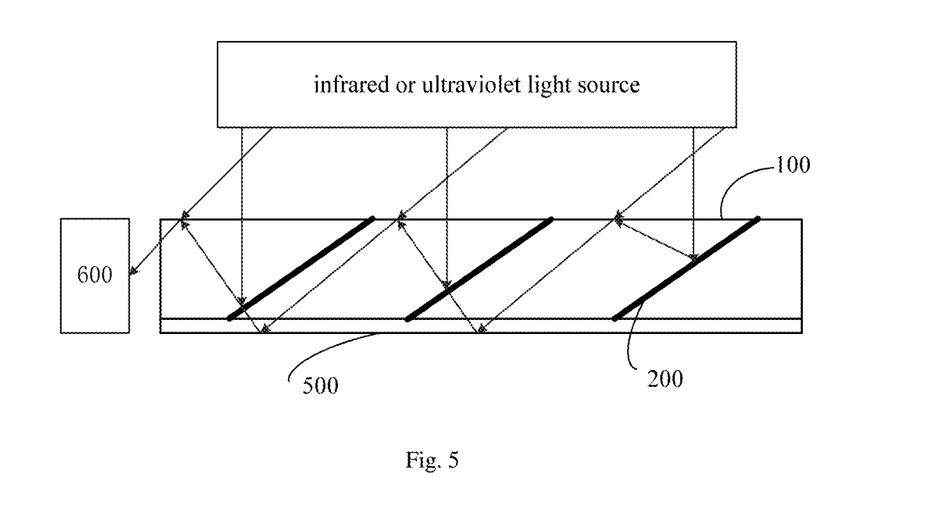
FIG. 5 shows a schematic diagram of optical paths of a waveguide assembly for infrared sensing according to at least one embodiment of the present disclosure.
Figure 7:
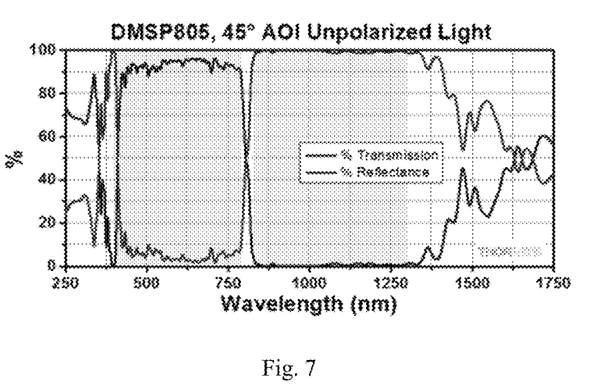
FIG. 7 shows a schematic diagram of optical performances of a low-pass dichroic film according to at least one embodiment of the present disclosure.

In some optional embodiments, the waveguide assembly further includes a sensor arranged on a side of the waveguide assembly and configured to receive the infrared or ultraviolet light exiting from the waveguide assembly. FIG. 5 is to illustrate the operating principle in the embodiments of the present disclosure by taking the infrared light as an example, which is not limited in the present disclosure. As shown in FIG. 5, the waveguide assembly further includes: a light source and a sensor 600. The light-exiting surface of the waveguide assembly is a first surface, and a surface opposite to the light-exiting surface of the waveguide assembly is a second surface. The waveguide assembly further includes: a low-pass dichroic film 500 arranged on a side of the light-exiting surface of the waveguide assembly. The low-pass dichroic film 500 has large transmittance for visual light and a large reflective index for the infrared light. Specifically, transmittance of the low-pass dichroic film 500 for light with wavelengths in a range from 400 nm to 760 nm is greater than 80%, and a reflective index of the low-pass dichroic film 500 for light with wavelengths in a range from 800 nm to 1300 nm is greater than 85%. FIG. 7 shows a schematic diagram of optical performances of a low-pass dichroic film according to at least one embodiment of the present disclosure. By using the low-pass dichroic film having the above-mentioned characteristics, most of the visible light can be transmitted through the low-pass dichroic film and exit from the light-exiting surface of the waveguide assembly, and most of the infrared light is reflected by the low-pass dichroic film and exit from the second surface or the side surface of the waveguide assembly, thereby improving the usage efficiency of the visible light and the infrared light.

As shown in FIG. 5, the infrared light emitted from the infrared light source is incident into the waveguide assembly from the second surface of the waveguide assembly, part of the infrared light is reflected by the infrared reflective film of the reflective sheet 200, and the reflected infrared light is reflected multiple times by the first surface and the second surface of the waveguide assembly and then transmitted through the adjacent reflective sheets 200, and this part of the infrared light are sequentially reflected or transmitted until being received by the infrared sensor 600. Part of the infrared light is reflected by the low-pass dichroic film 500, then transmitted onto the second surface of the waveguide assembly through the reflective sheets 200, and reflected by the second surface of the waveguide assembly and then incident into the low-pass dichroic film 500, and this part of the infrared light are sequentially reflected or transmitted until being received by the infrared sensor 600. In such a manner, the infrared light emitted by the infrared light source is transmitted through the waveguide assembly, the light exiting from the waveguide assembly is expanded both in the horizontal direction and in the vertical direction. Therefore, it can be seen from FIG. 5, an incident light beam is wide, the infrared sensor 600 can collect the light beam in a wider light-incident surface, i.e., a wider entrance pupil region, and thus the entrance pupil of the infrared light is expanded.

Figure 6:
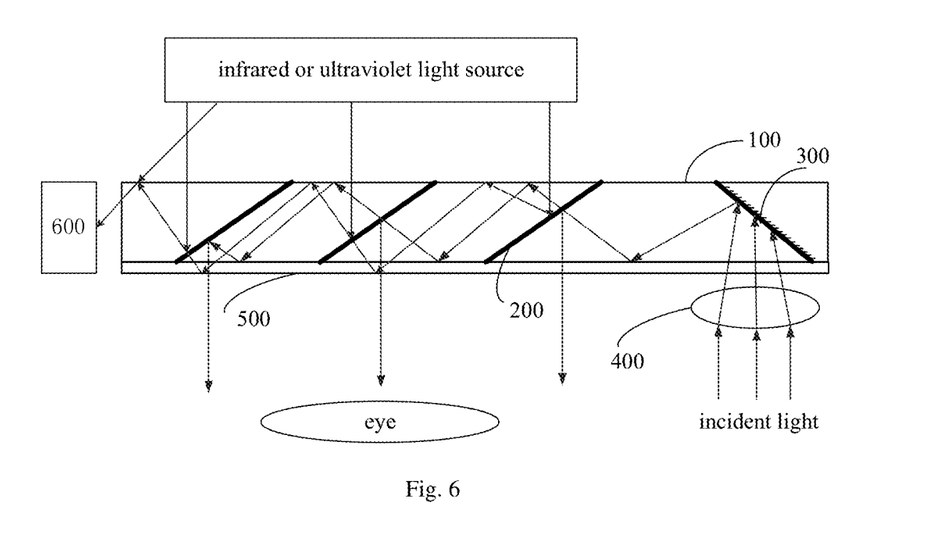
FIG. 6 shows a schematic diagram of optical paths of a waveguide assembly for exit pupil expansion and infrared sensing according to at least one embodiment of the present disclosure.

As shown in FIG. 6, FIG. 6 shows a schematic diagram of optical paths of a waveguide assembly for exit pupil expansion and infrared sensing according to at least one embodiment of the present disclosure. Since the visible light reflective film and the infrared reflective film are respectively arranged on both sides of the reflective sheet, not only the exit pupil expansion as described in the embodiment of FIG. 4 is realized, but also the infrared sensing function as described in the embodiment of FIG. 5 is realized with the waveguide assembly without additional optical elements. Therefore, multi-functional integration is achieved while the lightness and thinness of the waveguide assembly is ensured.

In practical applications, the light exiting from the light-exiting surface of the waveguide assembly is received by human eyes, and it is critical to ensure the uniformity of the exiting light as the human eyes are sensitive to an intensity of the exiting light. As shown in FIG. 4, a light loss is smaller when the the number of reflections of the light reflected by the reflective sheet 200 close to the first coupling input component 400 into the human eyes is less with less, and the intensity of the light exiting from the light-exiting surface close to the first coupling input component 400 is high; the number of reflections of the light reflected by the reflective sheet 200 away from the first coupling input component 400 into the human eyes is more with more light loss, and the intensity of the light exiting from the light-exiting surface away from the first coupling input component 400 is low. Therefore, the brightness of the light on the light-exiting surfaces of the waveguide assembly is uneven, affecting the user experience.

In some optional embodiments, reflective indexes of the first reflective films of the reflective sheets 200 arranged sequentially are set to be larger sequentially along a light propagation direction of the coupled incident light transmitting in the waveguide structure (that is, the direction from left to right in FIGS. 4 to 6), so as to ensure the uniformity of an intensity of the emergent light beam. Hence, the brightness of the light beam reflected into the human eyes can be maintained in some uniformity. Optionally, the first reflective film of the reflective sheet 200 may be composed of phosphorus-doped antimony oxide tin powder.

Specifically, it is assumed that the waveguide assembly has five reflective sheets 200, and x1, x2, x3, x4, and x5 represent reflective indexes of the first reflective films of the reflective sheets 200 arranged sequentially along the light propagation direction of the coupled incident light passing through the waveguide structure, such that the intensity of the light exiting from the first reflective films of the reflective sheets 200 is substantially the same, which needs to meet the following formula:

$$x_1 \approx (1-x_1) \times x_2 \approx (1-x_1) \times (1-x_2) \times x_3 \approx (1-x_1) \times (1-x_2) \times (1-x_3) \times x_4 \approx (1-x_1) \times (1-x_2) \times (1-x_3) \times (1-x_4) \times x_5.$$

If the reflective index x1 of the first reflective film close to the light incident side of the waveguide assembly is known, the reflective indexes x2, x3, x4, and x5 of the first reflective film of the other four reflective sheets can be estimated according to the above formula. Optionally, the reflective indexes x1, x2, x3, x4, and x5 of the first reflective films of the reflective sheets 200 sequentially arranged from the light incident side to the light emitting side of the waveguide assembly are 12.88%, 13.6%, 15.8%, 18.8% and 23.1% respectively, to ensure the uniformity of the exiting light of the waveguide assembly. The reflective indexes of the first reflective films may be set by those skilled in the art according to actual conditions.

In practical applications, the transmittance of the first reflective film of the leftmost reflective sheet of the waveguide assembly may be set to be zero to prevent light from leaking from the left side. Specifically, the first reflective film of the leftmost reflective sheet of the waveguide assembly has transmittance of 0, a reflective index of 23.1%, and absorptance of 76.9%.

Similarly, the intensities of the light beam exiting from the second reflective film of each of the reflective sheets needs to be ensured to be uniform. Optionally, the reflective indexes of the second reflective films of the reflective sheets 200 sequentially arranged from the light incident side to the light emitting side of the waveguide assembly are sequentially decreased. Specifically, the reflective indexes of the second reflective films of the reflective sheets 200 sequentially arranged from the light incident side to the light emitting side of the waveguide assembly are 23.1%, 18.8%, 15.8% and 13.6% respectively, to ensure that the intensities of the light beam captured by the infrared sensor 600 exiting from the second reflective films of the reflective sheets are substantially the same, improving the effectiveness of the infrared detection of the infrared sensor 600.

That is, the reflective indexes of the first reflective films of the plurality of reflective sheets are sequentially increased along the direction from the light incident side to the light exiting side of the waveguide assembly, and the reflective indexes of the second reflective films of the plurality of reflective sheets are sequentially decreased along the direction from the light incident side to the light exiting side of the waveguide assembly.

The waveguide assembly integrated with sensing functions is described by taking an integrated infrared sensing function as an example in the above embodiments. The waveguide assembly integrated with sensing functions may also be integrated with an ultraviolet detecting function, as long as the infrared reflective film 403 is replaced by an ultraviolet reflective film and the infrared sensor 600 is replaced by an ultraviolet sensor. Since the inventive concept is similar, those skilled in the art can derive a waveguide assembly integrated with an ultraviolet detecting function based on the waveguide assembly integrated with sensing functions, which is not described in details herein.

According to the embodiments of the present disclosure, the exit pupil can be expanded while the infrared sensing or ultraviolet detecting function can be integrated by providing an infrared reflective film or an ultraviolet reflective film on a side of each of the reflective sheets away from the light-exiting surface of the exit pupil expansion waveguide structure. The waveguide assembly integrated with an infrared sensing function may be used to measure the 3D infrared depth of focus by using the infrared sensor, or may measure temperature by using the infrared sensing device, and the waveguide assembly integrated with an ultraviolet sensing function may be used in the field of ultraviolet radiation treatment.

Figure 8:
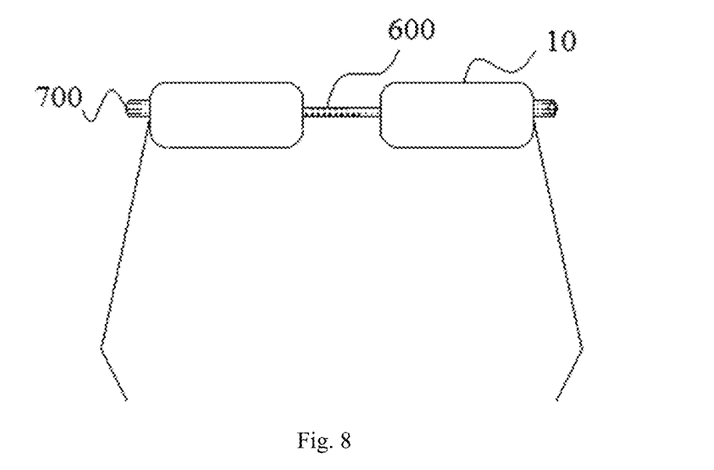
FIG. 8 shows a schematic structural diagram of an intelligent display wearable device according to at least one embodiment of the present disclosure.

In another aspect, an intelligent display wearable device is provided according to at least one embodiment of the present disclosure, which includes the above-described waveguide assembly integrated with sensing functions. Optionally, the intelligent display wearable device may be AR glasses. Referring to FIG. 8, the intelligent display wearable device includes a pair of lenses 400, and each of the lenses 400 includes the above-described waveguide assembly. Hence, the intelligent display wearable device may have all features and advantages of the above-described waveguide assembly, which are not repeated any more herein. All in all, the intelligent display wearable device not only has the augmented reality display but also has the infrared or ultraviolet sensing functions, and the intelligent display wearable device is thin.

According to embodiments of the present disclosure, the intelligent display wearable device may include a helmet (such as a helmet having goggles) or glasses having two lenses.

In some optional embodiments of the present disclosure, referring to FIG. 8, the intelligent display wearable device may further include a sensor 600, and the sensor 600 is arranged between two lenses 400. Hence, the infrared or ultraviolet information may be captured by using the sensor, while the thickness of the intelligent display wearable device is not increased.

In some optional embodiments of the present disclosure, referring to FIG. 8, the intelligent display wearable device may further include: two second coupling input components 700, an environment image acquisition component and a communication component. The second coupling input components 700 are arranged on a side of the lenses in the goggles or glasses away from the sensor 600. The environment image acquisition component is arranged on a side of the helmet or glasses away from the human eyes, and the communication component is coupled to the second coupling input component 700 and the environment image acquisition component. According to embodiments of the present disclosure, in usage of the helmet or the glasses, the augmented reality display may be realized by using the waveguide assembly in the goggles or glasses, while the light entering the coupling end may be reflected multiple times by the infrared or ultraviolet reflective film in the waveguide assembly, and the infrared or ultraviolet information is captured by the sensor. The external environment images are captured by using the environment image acquisition component, and the infrared or ultraviolet information and the environment images are transmitted into the augmented reality server by using the communication component, achieving multi-functional integration.

According to an embodiment of the present disclosure, the waveguide assembly integrated with sensing functions includes a plurality of reflective sheets, an infrared or ultraviolet reflective film and a visible light reflective film are respectively arranged on both sides of each of the reflective sheets, and the corresponding sensors are arranged to detect the emitted infrared or ultraviolet signals. In this case, an infrared detecting or ultraviolet sensing function may be integrated while the exit pupil is extended. Since the infrared or ultraviolet reflective film and the reflective film for extending the exit pupil are respectively integrated on both sides of the reflective sheet, the bidirectional coupling can be achieved without additional reflective sheet, decreasing the components and reducing the weight of the waveguide assembly. Therefore, multi-functional integration is achieved while the lightness and thinness of the waveguide assembly is ensured.

In addition, the intelligent display wearable device may have a larger angle as the geometric optical waveguide expand an entrance pupil for the infrared or ultraviolet light, and may collect wider infrared or ultraviolet signals, as compared with infrared or ultraviolet sensing camera lens in the related art. Although the infrared or ultraviolet stray light exists, the presence of the infrared stray light has no effect on the viewing experience of the helmet or glasses, since the infrared or ultraviolet signals are invisible for the human eyes.

According to embodiments of the present disclosure, since the intelligent display wearable device is provided with a sensor, the sensor may be an infrared sensor or an ultraviolet sensor. The intelligent display wearable device integrated with an infrared sensing function may be used to measure the 3D infrared depth of focus by using the infrared sensor, or may measure temperature by using the infrared sensing device, and the intelligent display wearable device integrated with an ultraviolet sensing function may be used in the field of ultraviolet radiation treatment.

In the description of the disclosure, orientation or position relationships indicated by such terms as "on/above" and "under/below" are the orientation or position relationships as shown in drawings, which are merely used for easily describing the disclosure, but do not demand that the present disclosure must be constructed and operated in the specified orientation, thus, which should not be understood to limit the present disclosure.

In the description of the specification, the description of reference terms "an embodiment", "another embodiment" means that the specific feature, structure, material or characteristic described in conjunction with the embodiments are contained in at least one embodiment of the present disclosure. The schematic expression of the above-mentioned terms needs not to be aimed at the same embodiment or example in the specification. Moreover, the described specific feature, structure, material or characteristic may be combined in a suitable way in any one or more embodiments or examples. Additionally, different embodiments or examples and the features of different embodiments or examples may be conjugated and combined by those skilled in the art without mutual conflict. Further, it should be noted that terms "first" and "second" are merely used for description, but should not understood to indicate or imply relative importance or implicitly indicate the number of the indicated technical features in the specification.

The embodiments described above are only the optional embodiments of the present disclosure and is not intended to define the present disclosure. Any changes, equivalent substitutions, improvements and so on made within the principles of the present disclosure should all fall within the protection scope of the present disclosure.

What is claimed is:

1. A waveguide assembly integrated with sensing functions, comprising:
    an exit pupil expansion waveguide structure; and
    a plurality of reflective sheets, wherein the plurality of reflective sheets is arranged at intervals in the exit pupil expansion waveguide structure and arranged obliquely with respect to a light-exiting surface of the exit pupil expansion waveguide structure,
    wherein a first reflective film and a second reflective film are respectively arranged on two sides of each of the plurality of reflective sheets, the second reflective film is an infrared reflective film or an ultraviolet reflective film and arranged on a side of the reflective sheets away from the light-exiting surface of the exit pupil expansion waveguide structure, and the first reflective film is arranged on a side of the reflective sheets close to the light-exiting surface of the exit pupil expansion waveguide structure.

2. The waveguide assembly according to claim 1, wherein each of the first reflective films of the plurality of reflective sheets is a visible light reflective film.

3. The waveguide assembly according to claim 2, further comprising: a light source and a sensor, wherein in a case that the second reflective film is an infrared reflective film, the light source is an infrared light source, and the sensor is an infrared sensor; and in a case that the second reflective film is an ultraviolet reflective film, the light source is an ultraviolet light source, and the sensor is an ultraviolet sensor.

4. The waveguide assembly according to claim 3, further comprising: a low-pass dichroic film configured to transmit visible light and reflect infrared or ultraviolet light,
    wherein the light-exiting surface of the exit pupil expansion waveguide structure is a first surface, a surface opposite to the light-exiting surface of the exit pupil expansion waveguide structure is a second surface, and the low-pass dichroic film is arranged below the first surface of the exit pupil expansion waveguide structure;
    wherein the light source is arranged above the second surface of the exit pupil expansion waveguide structure, and is configured to emit the infrared or ultraviolet light to the second reflective film and the low-pass dichroic film; and
    wherein the sensor is configured to receive outgoing light that is emitted by the light source, and then reflected repeatedly by the second reflective film or the low-pass dichroic film.

5. The waveguide assembly according to claim 4, wherein transmittance of the low-pass dichroic film for light with wavelengths in a range from 400 nm to 760 nm is greater than 80%, and a reflective index of the low-pass dichroic film for light with wavelengths in a range from 800 nm to 1300 nm is greater than 85%.

6. The waveguide assembly according to claim 4, wherein a total reflective material is coated on a side of the first surface of the exit pupil expansion waveguide structure close to the reflective sheets, and is coated on a side of the second surface of the exit pupil expansion waveguide structure close to the reflective sheets.

7. The waveguide assembly according to claim 1, wherein the plurality of reflective sheets is arranged in parallel at equal intervals along a light propagation direction of coupled incident light propagating in the waveguide structure.

8. The waveguide assembly according to claim 7, wherein reflective indexes of the first reflective films of the plurality of reflective sheets are set to be larger sequentially along the light propagation direction of the coupled incident light propagating in the waveguide structure.

9. The waveguide assembly according to claim 8, wherein the number of the plurality of reflective sheets is 5, and the reflective indexes of the first reflective films of the plurality of reflective sheets are 12.88%, 13.6%, 15.8%, 18.8%, and 23.1% sequentially along the light propagation direction of the coupled incident light propagating in the waveguide structure; and
    wherein the first reflective film with the reflective index of 23.1% is closest to a light-exiting side of the exit pupil expansion waveguide structure, and the first reflective film is set to have transmittance of 0 and absorptance of 76.9%.

10. The waveguide assembly according to claim 1, wherein reflective indexes of the second reflective films of the plurality of reflective sheets are set to be larger sequentially along a light propagation direction of coupled incident light propagating in the waveguide structure.

11. The waveguide assembly according to claim 10, wherein the number of the plurality of reflective sheets is 5, and the reflective indexes of the first reflective films of the plurality of reflective sheets are 23.1%, 18.8%, 15.8%, 13.6%, and 12.88% sequentially along the light propagation direction of the coupled incident light propagating in the waveguide structure.

12. An intelligent display wearable device, comprising: a pair of lenses, wherein each of the lenses comprises a waveguide assembly integrated with sensing functions, and the waveguide assembly integrated with sensing functions comprises:
    an exit pupil expansion waveguide structure; and
    a plurality of reflective sheets, wherein the plurality of reflective sheets is arranged at intervals in the exit pupil expansion waveguide structure and arranged obliquely with respect to a light-exiting surface of the exit pupil expansion waveguide structure,
    wherein a first reflective film and a second reflective film are respectively arranged on two sides of each of the plurality of reflective sheets, the second reflective film is an infrared reflective film or an ultraviolet reflective film and arranged on a side of the reflective sheets away from the light-exiting surface of the exit pupil expansion waveguide structure, and the first reflective film is arranged on a side of the reflective sheets close to the light-exiting surface of the exit pupil expansion waveguide structure.

13. The intelligent display wearable device according to claim 12, wherein each of the first reflective films of the plurality of reflective sheets is a visible light reflective film, and the plurality of reflective sheets is arranged in parallel at equal intervals along a light propagation direction of coupled incident light propagating in the waveguide structure.

14. The intelligent display wearable device according to claim 13, wherein the waveguide assembly further comprises: a light source and a sensor, wherein in a case that the second reflective film is an infrared reflective film, the light source is an infrared light source, and the sensor is an infrared sensor; and in a case that the second reflective film is an ultraviolet reflective film, the light source is an ultraviolet light source, and the sensor is an ultraviolet sensor.

15. The intelligent display wearable device according to claim 14, wherein the waveguide assembly further comprises: a low-pass dichroic film configured to transmit visible light and reflect infrared or ultraviolet light,
    the light-exiting surface of the exit pupil expansion waveguide structure is a first surface, a surface opposite to the light-exiting surface of the exit pupil expansion waveguide structure is a second surface, and the low-pass dichroic film is arranged below the first surface of the exit pupil expansion waveguide structure,
    the light source is arranged above the second surface of the exit pupil expansion waveguide structure, and configured to emit the infrared or ultraviolet light to the second reflective film and the low-pass dichroic film, and
    the sensor is configured to receive an emergent light after the light emitted by the light source is reflected repeatedly through the second reflective film and the low-pass dichroic film in the waveguide assembly.

16. The intelligent display wearable device according to claim 15, wherein transmittance of the low-pass dichroic film for light with wavelengths in a range from 400 nm to 760 nm is greater than 80%, and a reflective index of the low-pass dichroic film for light with wavelengths in a range from 800 nm to 1300 nm is greater than 85%.

17. The intelligent display wearable device according to claim 14, wherein the sensor is arranged between two lenses.

18. The intelligent display wearable device according to claim 17, further comprising:
    a first coupling input component configured to couple visible light into the first reflective films of the waveguide assembly; and
    two second coupling input components configured to couple infrared or ultraviolet light into the second reflective films of the waveguide assembly,
    wherein each of the second coupling input components is arranged on a side of the respective lens away from the sensor.

19. The intelligent display wearable device according to claim 12, comprising a helmet or glasses having two lenses.

20. The intelligent display wearable device according to claim 12, wherein
    reflective indexes of the first reflective films of the plurality of reflective sheets are set to be larger sequentially along a light propagation direction of coupled incident light propagating in the waveguide structure, and reflective indexes of the second reflective films of the plurality of reflective sheets are set to be larger sequentially along the light propagation direction of the coupled incident light propagating in the waveguide structure.

* * * * *